United States Patent
Brännström et al.

(10) Patent No.: US 6,247,301 B1
(45) Date of Patent: Jun. 19, 2001

(54) GASIFIER AND A POWER PLANT

(75) Inventors: Roine Brännström; Anders Lövgren; Dirk Veenhuizen, all of Finspång (SE)

(73) Assignee: ABB Carbon AB, Finspang (SE)

( * ) Notice: Subject to any disclaimer, the term of this patent is extended or adjusted under 35 U.S.C. 154(b) by 0 days.

(21) Appl. No.: 09/077,547

(22) PCT Filed: Dec. 11, 1996

(86) PCT No.: PCT/SE96/01639

§ 371 Date: Aug. 13, 1998

§ 102(e) Date: Aug. 13, 1998

(87) PCT Pub. No.: WO97/21789

PCT Pub. Date: Jun. 19, 1997

(30) Foreign Application Priority Data

Dec. 11, 1995 (SE) .................................................. 9504427

(51) Int. Cl.⁷ ................................................ F02B 43/00
(52) U.S. Cl. ...................................... 60/39.12; 60/39.463
(58) Field of Search .............................. 60/39.12, 39.463, 60/39.465

(56) References Cited

U.S. PATENT DOCUMENTS

| | | | |
|---|---|---|---|
| 4,472,936 | * 9/1984 | Uchiyama et al. | 60/39.06 |
| 5,161,367 | 11/1992 | Scalzo | 60/39.12 |
| 5,265,410 | * 11/1993 | Hisatome | 60/39.12 |
| 5,509,264 | * 4/1996 | Ito et al. | 60/39.12 |
| 5,706,645 | * 1/1998 | Mollot et al. | 60/39.06 |
| 5,918,466 | * 7/1999 | Cloyd et al. | 60/735 |

FOREIGN PATENT DOCUMENTS

| | | |
|---|---|---|
| 488 579 A1 | 3/1992 | (EP) . |
| 5-87315 | 4/1993 | (JP) . |
| 5-93513 | 4/1993 | (JP) . |
| 458 955 | 5/1989 | (SE) . |
| WO 95/22690 | 8/1995 | (WO) . |

\* cited by examiner

Primary Examiner—Charles G. Freay
(74) Attorney, Agent, or Firm—Connolly Bove Lodge & Hutz

(57) ABSTRACT

A power plant is disclosed having a combustion chamber (1) in which the combustion of a combustible material is performed, while forming hot combustion gases to drive a gas turbine device (14, 20, 27). A topping combustion device (8, 23) is arranged to receive the combustion gas and raise its temperature to a level suitable for the gas turbine device. A gasifying reactor (1) is arranged to produce a combustible gas for combustion in the topping combustion device (8, 23). A first conduit member (18) is arranged to supply an oxygen-containing gas, necessary for gasification, to the gasifying reactor (10) and a second conduit member (9) is arranged to supply the combustible gas from the gasifying reactor (10) to the topping combustion device (8, 23). A member (35) is arranged at the second conduit member (9) and adapted to cool down the combustible gas supplied to the topping combustion device (8, 23). A purifying member (99) is provided on the second conduit member (9) downstream of the cooling member (35) and adapted to purify the cooled, combustible gas prior to being supplied to the topping combustion device (8, 23).

13 Claims, 1 Drawing Sheet

GASIFIER AND A POWER PLANT

THE TECHNICAL FIELD OF THE INVENTION AND PRIOR ART

The present invention refers to a gasifier for producing a combustible gas, comprising a gasifying reactor in which a combustible gas is intended to be produced from a fuel, first conduit members arranged to supply an oxygen-containing gas necessary for the gasification to the gasifying reactor, and second conduit members arranged to discharge combustible gas from the gasifying reactor. Furthermore, the invention refers to a power plant comprising a combustion chamber in which the combustion of a combustible material is intended to be performed while forming hot combustion gases, a gas turbine device adapted to be driven by the combustion gases, a topping combustion device arranged to receive the combustion gases and raise the temperature thereof to a level suitable for the gas turbine device, a gasifying reactor arranged to produce a combustible gas for combustion in the topping combustion device to produce said temperature increase, first conduit members arranged to supply an oxygen-containing gas necessary for the gasification to the gasifying reactor, and second conduit members arranged to supply the combustible gas from the gasifying reactor to the topping combustion device. By combustible material or fuel is meant all fuels which may burn, such as for example pit coal, brown coal, peat, biofuel, oil shale, pet coke, waste, oils, hydrogen gas and other gases, etc.

The invention will now be discussed and illustrated in different applications in connection with a pressurized fluidized bed, a so called PFBC power plant (pressurized fluidized bed combustion). However, the invention is not limited to such applications but may be utilized in all conceivable power plants, especially gas turbine plants and also in connection with independent gasifying devices, so called gasifiers.

In a conventional PFBC power plant the bed is supplied with combustion air in the form of compressed air from the pressure vessel enclosing a combustion chamber in which the fluidized bed is housed, via fluidizing nozzles beneath the bed. The combustion gases formed during the combustion process pass a free board above the bed surface, whereafter they are purified and conveyed to a gas turbine. The combustion gases drive the gas turbine, which in turn drives on one hand an electric generator and on the other hand a compressor supplying the pressure vessel with compressed air. In the bed the fuel is combusted at a temperature in the order of 850° C. For generating steam a steam generator in the form of a tube arrangement is disposed in the bed. Energy is supplied by the bed via the steam turbines to which the steam is conveyed in a steam system. At full load the whole tube arrangement is disposed within the bed. A PFBC plant is characterized by a small plant volume in relation to the effect produced in comparison with other types of plants where the fuel is combusted in a fluidized bed at atmospheric pressure conditions. In addition, the efficiency of a PFBC plant is high. Furthermore, the combustion in a PFBC plant is performed at favourable conditions from an environmental and economical point of view.

One problem which is connected to the PFBC technique and which has prevented a substantially high efficiency is that the upper temperature limit at which the combustion of for example coal is performed in a fluidized bed, normally mounts to about 850 to 950° C. dependent on the coal quality. his means that the drive gas for the gas turbine of the PFBC power plant has a temperature which is about as high as the temperature in the fluidized bed. Since the turbine effect rises strongly with an increased temperature of the drive gas it is desirable to have a higher gas temperature, up to 1200 to 1500° C. in order to reach an optimal level of the effect from the gas turbine part of the plant. In order to remedy this disadvantage it has been suggested to raise the temperature of the gases leaving the PFBC combustion chamber by means of a topping combustion chamber in which a fuel is combusted. Since the drive gases pass the topping combustion chamber their temperature may be increased prior to being supplied to the gas turbine. Such technique is known from SE-B-458 995. Furthermore, in this document is described how the fuel for the topping combustion chamber may be produced by means of a gasifying reactor, in which coal at under-stoichiometric conditions is gasified while producing a combustible gas supplied to the topping combustion chamber.

The combustible gas produced in the gasifying reactor has a relatively high temperature, about 800 to 1000° C. as it leaves the gasifying reactor. Furthermore, the combustible gas leaving the gasifying reactor contains dust particles, which at such a high temperature may occur in a melted viscous form. Because thereof a possible purifying filter provided in the conduit member of the combustible gas will rapidly be stopped up. Furthermore, the hot dust containing combustible gas causes a problem in the regulating valves which may be provided for regulating the gas flow. In order to overcome this problem it is known to utilize expensive and complicated regulating valves to be cooled down by vaporizing of water and superheating of steam.

Furthermore, it should be noted that in the cases when the combustible gas is utilized for combustion in a power plant, for instance in a topping combustion chamber arranged prior to a gas turbine, such dust particles result in erosion and corrosion in the gas turbine leading to a premature wear. In order to purify the combustible gas it has been suggested to let the hot dust containing gas pass a cyclone separator at the outlet of the gasifying reactor. However, such a separator is not as effective as a filter and especially insufficient for the high purification level required of the gas to be supplied to a gas turbine.

JP-A-5/87315 discloses a power plant comprising a gasifying reactor having a fluidized bed, a combustion chamber with a fluidized bed and a topping combustion chamber. The combustion gases from the gasifying reactor and the combustion chamber are purified and supplied to the topping combustion chamber where a combustion takes place. The combustion gases from the topping combustion chamber drive a gas turbine which in turn drives a generator and a compressor compressing the air supplied to the gasifying reactor, the combustion chamber and the topping combustion chamber. The combustion air supplied to the topping combustion chamber is heat-exchanged by means of air tubes provided in the fluidized bed of the combustion chamber.

JP-A-5/93513 discloses a power plant having a gasifying reactor for producing a combustible gas. The combustible gas is purified and supplied to a topping combustion chamber. The solid rest products formed in the gasifying reactor are supplied to a combustion chamber comprising a fluidized bed where they are combusted. The combustion gases from the combustion chamber are also purified and supplied to the topping combustion chamber. Moreover, the topping combustion chamber is supplied with oxygen from outside and a combustion takes place so that the combustion gases formed in the topping combustion chamber are utilized for driving a gas turbine.

SUMMARY OF THE INVENTION

The object of the present invention is to remedy the problems mentioned above and to treat the gas leaving a gasifying reactor in such a manner that it may be utilized in a better way in the subsequent process stages.

This object is obtained by the gasifying device initially defined and characterized by a member arranged at the second conduit members and adapted to cool down the combustible gas leaving the gasifying reactor. By lowering the temperature of the combustible gas leaving the gasifying reactor in such a manner the stresses on the subsequent equipment decrease. Especially, it is possible to lower the temperature to under 600° C. so that the dust particles present in the gas will be in solid form and not stick to and stop up the subsequent equipment.

According to an embodiment there is a purifying member provided on the second conduit member downstream of the cooling member and adapted to purify the cooled, combustible gas. Thereby, the purifying member may comprise a filter. By means of the cooling member according to the invention such a filter may be of a conventional construction, i.e. no expensive sintered ceramic hot gas filter is required. Furthermore, there may be at least one regulating valve provided on the second conduit downstream of said cooling member and adapted to regulate the amount of combustible gas leaving the gasifying reactor. Also such a regulating valve may be of a conventional construction and need not demonstrate any special arrangement for cooling purposes.

According to a further embodiment of the invention the cooling member comprises a heat-exchanger adapted to cool down the combustible gas by means of the oxygen-containing gas supplied to the gasifying reactor. By means of such an arrangement it is possible to recover the heat energy when cooling the combustible gas and utilize this energy in the further gasifying process.

According to a further embodiment the combustible gas so cooled down is suitable to be supplied to a combustion device connected to the second conduit member and adapted to combust the combustible gas while forming hot combustion gases. Advantageously, there may be a gas turbine arranged to be driven at least partly by the hot combustion gases and a compressor driven by the gas turbine and having an outlet connected to the first conduit member for the supply of compressed oxygen-containing gas to the gasifying reactor. In order to assure a higher pressure of the combustible gas and a proper supply to the combustion device a further compressor may be arranged in the first conduit member downstream of the compressor driven by the gas turbine and adapted to further compress the oxygen-containing gas supplied to the gasifying reactor.

The object is also obtained by the power plant initially defined and characterized by a member arranged at the second conduit member and adapted to cool down the combustible gas supplied to the topping combustion device. Thus, such a cooling member enables removal of the dust particles present in the combustible gas in an efficient manner and hence the mere supply of highly purified combustion gases to the gas turbine is guaranteed.

Preferable embodiments of the power plant are defined in the dependent claims 12–24. In particular, it should be noted that the topping combustion device may comprise a topping combustion chamber provided between the combustion chamber and the gas turbine. Furthermore, the gas turbine device may comprise at least a first turbine and a second turbine, and furthermore the topping combustion device may comprise a reheating device provided between the first and second turbine and adapted to raise the temperature of the combustion gases having passed the first turbine prior to entering the second turbine.

BRIEF DESCRIPTION OF THE DRAWING

The invention shall now be explained more closely by means of different, by way of example, embodiments, one of which is illustrated in the drawing attached.

DETAILED DESCRIPTION OF DIFFERENT EMBODIMENTS

Figure 1:
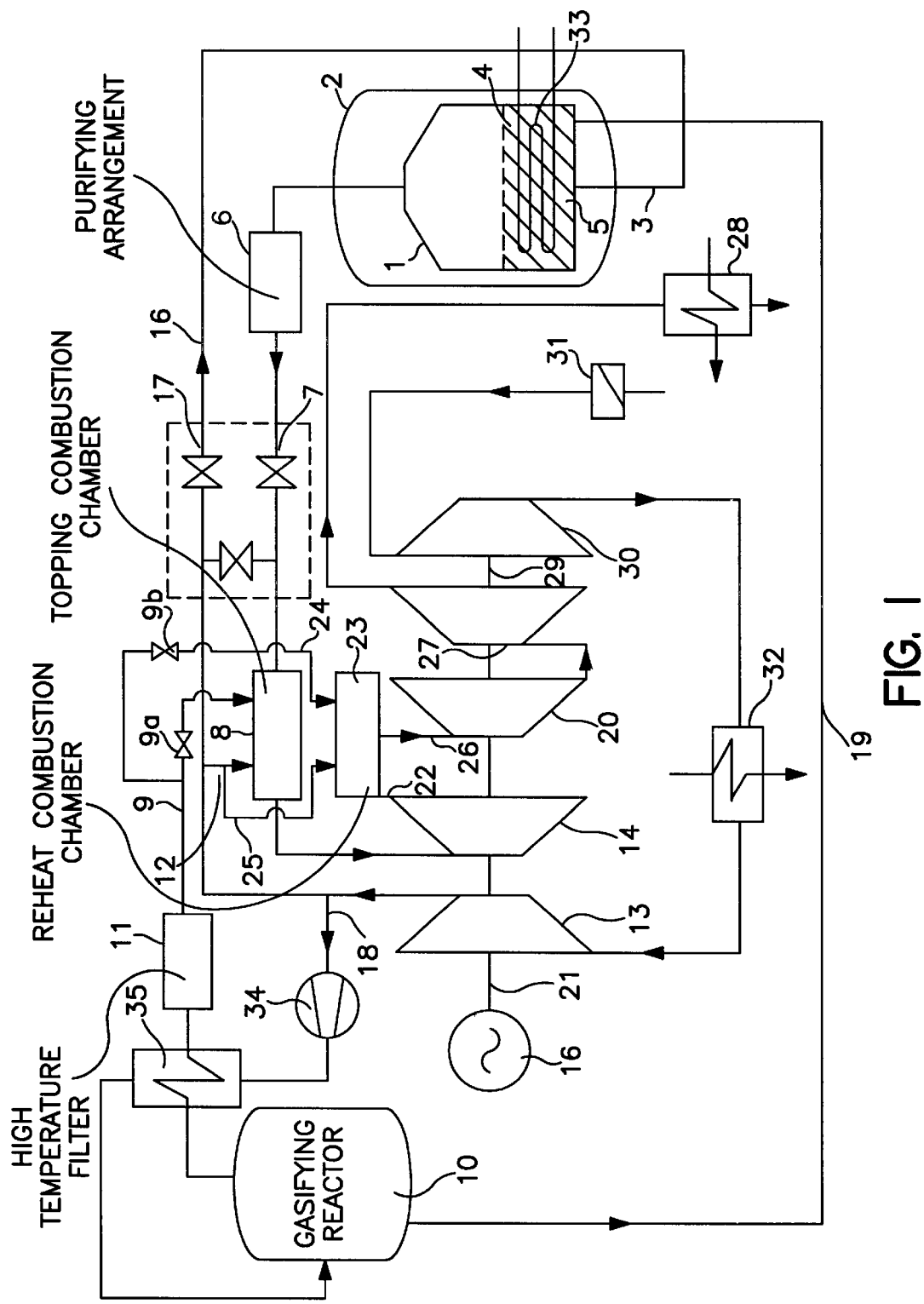
FIG. 1 of the drawing discloses schematically a PFBC power plant having a combined gas and steam cycle (the latter not disclosed).

A PFBC power plant, i.e. a plant for combustion of particulate fuel in a pressurized fluidized bed, is schematically disclosed in FIG. 1. The plant comprises a combustion chamber 1, being housed in a vessel 2, which may have a volume of in the order of $10^4 m^3$ and which may be pressurized to for example about 16 bar. Compressed oxygen-containing gas, in the example disclosed air, 3 for pressurizing the combustion chamber 1 and for fluidizing a bed 4 in the combustion chamber 1 is supplied to the pressure vessel 2. The compressed air is supplied to the combustion chamber 1 via fluidizing nozzles 5 schematically indicated and arranged at the bottom of the combustion chamber for fluidizing the bed 4 enclosed in the combustion chamber 1. The bed 4 is formed by bed material, granulate absorbent and a particulate fuel, preferably crushed coal which is combusted in the fluidizing air supplied to the bed 4. The combustion gases from the bed 4 are then conveyed via a purifying arrangement 6 which in the example is formed by a high temperature filter, which may be of a ceramic type and intended for high pressures, and further via an intercept valve 7 to a topping combustion chamber 8. Moreover, to the topping combustion chamber 8 a combustible gas is supplied via a conduit 9 from a gasifying reactor 10 of known type through a further high temperature filter 11. The flow of combustible gas to the topping combustion chamber 8 is regulated by means of the regulating valve 9a. In the topping combustion chamber the combustible gases are combusted in connection with the supply of compressed air via the conduit 12 from a high pressure compressor 13 by means of a burner, not disclosed, and are mixed with the combustion gases from the combustion chamber 1 for raising of the temperature of the latter in such a manner that the gases leaving the topping combustion chamber 8 have a temperature of about 1200–1500° C., making them suitable as a drive gas for driving a first gas turbine 14 in the form of a high pressure turbine. Consequently, because of the topping combustion chamber 8 the temperature of said combustion gases has been raised from about 850–950° C. to about 1200–1500° C. The high pressure turbine 14 and the high pressure compressor 13 are provided on the same shaft as a generator 15 by which useful electrical energy may be produced. The high pressure compressor also supplies compressed air to the PFBC combustion chamber 1 via the conduit 16 from which the conduit 12 branches. Thereby, an intercept valve 17 is provided between the high pressure compressor and the combustion chamber 1. Moreover, the high pressure compressor 13 supplies air via the conduit 18 for the gasification in the gasifying reactor 10. The rest fuel formed in the gasifying reactor 10 during the production of the combustible gas may be supplied to the bed 4 in the combustion chamber 1 via a fuel conduit 19.

The PFBC power plant disclosed in the figure is of an advanced type since it has a further gas turbine 20, in the form of an intermediate pressure turbine, which is provided on the same shaft 21 as the high pressure turbine 14 and the high pressure compressor 13. The gas which is expanded in the high pressure turbine 14 and which has a lowered temperature is conveyed via a conduit 22 to a reheating device 23 comprising a so called reheat combustion chamber. The reheat combustion chamber 23 receives a flow of said combustible gases, which is regulated by means of the regulating valve 9b and originate from the gasifying reactor 10, and compressed air from the high pressure compressor 13 in the same way as the topping combustion chamber 8, which is disclosed in FIG. 1, through the conduits 24 and 25, respectively, whereby these combustible gases are combusted by means of a burner not disclosed and the hot gases so formed are mixed with the combustion gases from the high pressure turbine 14 in order to once again raise the temperature thereof prior to being further supplied to the intermediate pressure turbine 20 via the conduit 26. In this way the effect of the intermediate pressure turbine 20 may be significantly increased.

The combustion gases expanded in the intermediate pressure turbine are supplied to a low pressure turbine 21. The combustion gases leaving the low pressure turbine 27 still contain energy to be utilized in an economizer 28. The low pressure turbine 27 is provided on a shaft 29 on which a low pressure compressor 30 also is provided. The low pressure compressor 30 is supplied with atmospheric air via a filter 31. Thus, the low pressure compressor 13 is driven by the low pressure turbine 27 and supplies from its outlet the high pressure compressor 13 with air which has been compressed in a first step. Preferably, the inlet of the low pressure turbine 27 is provided with a flow regulating device not disclosed and in the form of controllable guide blades on a guide blade arrangement so that the number of revolutions of the second shaft may be varied. Between the low pressure compressor 30 and the high pressure compressor 13 an intermediate cooler 32 is provided for lowering the temperature of the air supplied to the inlet of the high pressure compressor 13.

Furthermore, the power plant comprises a steam turbine side, which is not disclosed, but indicated by a tube arrangement 33 disposed in a fluidized bed 4, in which water is circulated, vaporized and superheated by heat exchange between the tubes and the bed material for receiving the heat generated by the combustion performed in the bed 4.

The conduit 18 from the high pressure compressor 13 for the supply of compressed air to the gasifying reactor 10 comprises a compressor device 34, which in the example disclosed is a so called booster compressor. Preferably, this is driven by an electrical motor but may also be driven by means of a steam turbine supplied with steam from the tube arrangement 33. For regulating the air flow through the conduit 18 the electrical motor may have a speed regulation and/or a rotatable guide blade arrangement may be provided in or before the compressor 34. By means of this compressor 34 the gas pressure of the air supplied to the gasifying reactor 10 may be further increased as it is desirable that the gas flow delivered by the gasifying reactor 10 has a higher pressure than the combustion gas flow reaching the topping combustion chamber 8. Due to this, the combustible gases may in every pressure situation in a simple way be supplied to the topping combustion chamber 8 and/or the reheat combustion chamber 23. In the gasifying reactor 10 a liquid or solid fuel, in this example particulate coal, is gasified and generates, in an under-stoichiometric process, combustible gases in a known manner. The purpose of providing an independent gasifying device, which operates at a higher pressure than the PFBC bed 4, in this manner is that the gas in the gasifying reactor 10 has to have a higher pressure than the pressure in the combustion chamber 8, 23 in order to be able to regulate the fuel flow and distribute the fuel flow equally in these combustion chambers. Thus, at a possible pressure of 16 bar in the PFBC combustion chamber 1 a pressure of about 26 bar in the gasifying reactor 10 may be obtained.

Furthermore, the conduit 18 from the high pressure compressor 13 comprises a heat-exchanger 35 provided downstream of the compressor device 34. Through the heat-exchanger 35 extends also the conduit 9 from the gasifying reactor 10. Consequently, this means that the relatively cold compressed air supplied to the gasifying reactor 10 will be heat-exchanged with the very hot combustible gas (800–1000° C.) leaving the gasifying reactor 10. Thus, the temperature of the gas conveyed through the heat-exchanger 35 may be lowered to a significantly lower temperature of under 600° C., which means that the dust particles occurring in melted form at the higher temperature will be in solid form after the heat-exchanger 35. Thereby, the risk that these gases and melted dust particles will stop up the high temperature filter 11 is significantly reduced. Furthermore, the filter 11 may be manufactured by conventional technique, i.e. it is not necessary to use sintered ceramic hot gas filters, since the temperature of the combustible gas has been lowered. A further advantage of this temperature reduction is that the regulating valves 9a, 9b may be of a conventional construction, i.e. it is not necessary to provide any sophisticated cooling by vaporizing of water and superheating of steam to assure the function of these regulating valves 9a, 9b. Such cooling is very expensive and requires extensive regulating and security equipment.

The invention is not limited to the embodiment described above but many possibilities of modifications thereof are possible within the scope of the subsequent claims and appear to be obvious for a person skilled in the art without deviating from the basic concept of the invention.

For instance, it would be possible to provide the plant with only two gas turbines, i.e. to dispense with the intermediate pressure turbine disclosed in FIG. 1. Thereby, the reheat combustion chamber 23 raises the temperature of the combustion gases from the high pressure turbine 14 and supplied to the low pressure turbine 27 which in such a case will receive gases with a higher pressure than described above and therefore would be mentioned intermediate pressure turbine.

Moreover, it is not necessary, though preferable, that the PFBC plant according to the invention has a topping combustion chamber 8, although it should be noted that the advantages of the reheat combustion chamber 23 may be adequately utilized in the case that such a topping combustion chamber 8 is present.

Of course, it is also possible in the case of more than two gas turbines to provide a reheat combustion chamber between the second and third gas turbines in the path of the combustion gases if so desired.

The air to the independent gasifying reactor 10 need not be taken from the high pressure compressor 13 but may be delivered directly from the atmosphere and be compressed to a desired level by means of one compressor in one or several stages.

The gasifying reactor 10 disclosed and having the heat-exchanger 36 according to the invention may also be utilized in another plant than the one described above. For instance, the combustible gas from the gasifying reactor 10 may be utilized for the combustion and driving of a gas turbine.

What is claimed is:

1. A power plant comprising:
  a combustion chamber (1) in which the combustion of a combustible material is performed while forming hot combustion gases,
  a gas turbine device (14, 20, 27) adapted to be driven by the combustion gases,
  a topping combustion device (8, 23) arranged to receive the combustion gases and raise the temperature thereof to a level suitable for the gas turbine device,
  a gasifying reactor (10) arranged to produce a combustible gas for combustion in the topping combustion device (8, 23) to produce said temperature increase,
  first conduit member (18) arranged to supply an oxygen-containing gas necessary for the gasification to the gasifying reactor (10), and
  second conduit member (9) arranged to supply the combustible gas from the gasifying reactor (10) to the topping combustion device (8, 23), characterized by a member (35) arranged at the second conduit member (9) and adapted to cool down the combustible gas supplied to the topping combustion device (8, 23), and a purifying member (11) provided on the second conduit member (9) downstream of said cooling member (35) and adapted to purify the cooled, combustible gas prior to being supplied to the topping combustion device (8, 23).

2. A power plant according to claim 1, characterized in that the purifying member comprises a filter (11).

3. A power plant according to claim 1, characterized by at least one regulating valve (9a, 9b) provided on the second conduit member (9) downstream of said cooling member (35) and adapted to regulate the amount of combustible gas supplied to the topping combustion device (8, 23).

4. A power plant according to claim 3, characterized in that the regulating valve (9a, 9b) is provided downstream of the purifying member (11).

5. A power plant according to the claim 1, characterized in that said cooling member (35) comprises a heat-exchanger adapted to cool down the combustible gas by heat exchange with the oxygen-containing gas (18) supplied to the gasifying reactor (10).

6. A power plant according to the claim 1, characterized by a compressor (13, 34) connected to the first conduit member (18) and adapted to compress the oxygen-containing gas supplied to the gasifying reactor (10).

7. A power plant according to claim 6, characterized in that the compressor (13) is driven by the gas turbine device (14).

8. A power plant according to claim 7, characterized by a further compressor (34) arranged at the first conduit member (18) downstream of the compressor (13) driven by the gas turbine device (14) and adapted to further compress the oxygen-containing gas supplied to the gasifying reactor (10).

9. A power plant according to claim 1, characterized in that the topping combustion device (8, 23) comprises a topping combustion chamber (8) provided between the combustion chamber and the gas turbine device.

10. A power plant according to claim 1, characterized in that the gas turbine device comprises at least one first turbine (14) and a second turbine (20, 27), and that the topping combustion device comprises a reheating device (23) provided between the first and second turbine and adapted to raise the temperature of the combustion gases having passed the first turbine (14) prior to entering the second turbine (20, 27).

11. A power plant according to claim 1, characterized in that the combustion chamber (1) is of a type comprising a fluidized bed (4).

12. A power plant according to claim 11, characterized in that the fluidized bed is pressurized.

13. A power plant according to claim 7, characterized in that said pressurizing is produced by means of the compressor (10, 13) driven by the gas turbine device (14, 20, 27).

* * * * *